Nov. 25, 1958  J. S. PILCH  2,861,812
EQUIPMENT MOUNTING SUB-FRAME ASSEMBLY FOR TRACTORS
Filed Aug. 27, 1957  4 Sheets-Sheet 1

INVENTOR.
JOHN S. PILCH
BY
Raymond A. Paquin
ATTORNEY.

Nov. 25, 1958 J. S. PILCH 2,861,812
EQUIPMENT MOUNTING SUB-FRAME ASSEMBLY FOR TRACTORS
Filed Aug. 27, 1957 4 Sheets-Sheet 3

INVENTOR.
JOHN S. PILCH
BY
Raymond A. Paquin
ATTORNEY.

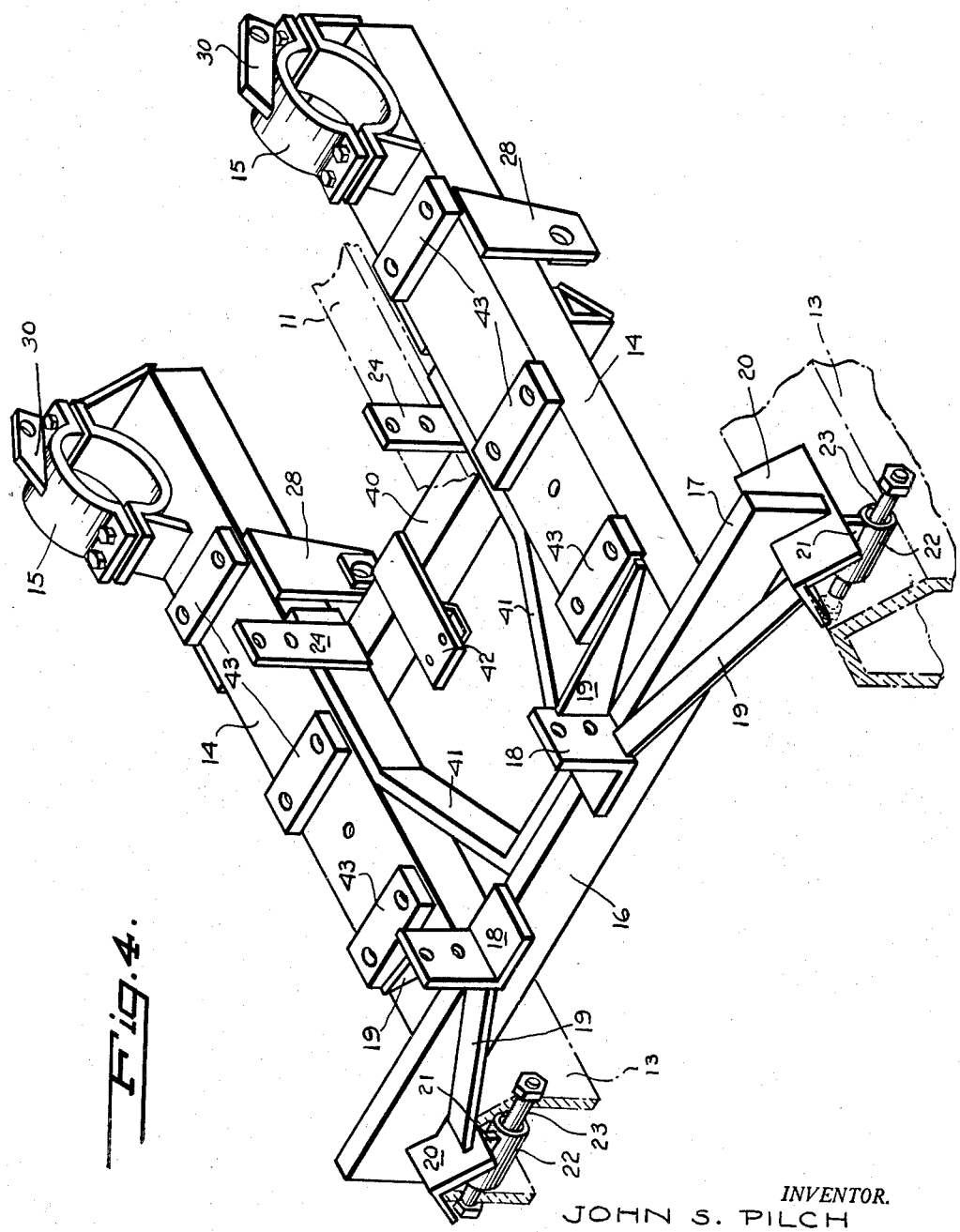

United States Patent Office 2,861,812
Patented Nov. 25, 1958

2,861,812
EQUIPMENT MOUNTING SUB-FRAME ASSEMBLY FOR TRACTORS

John S. Pilch, Ware, Mass.

Application August 27, 1957, Serial No. 680,541

4 Claims. (Cl. 280—106)

This invention relates to a new and improved equipment mounting sub-frame assembly for tractors.

An object of the invention is to provide an equipment mounting sub-frame assembly for tractors which can adapt or mount any kind of tractor mounted equipment on the tractor by simple attaching means.

Another object is to provide a device of the type set forth which is adapted to structurally reinforce the tractor by tying the motor frame to the axle housing for additional strength and which allows limited vertical movement of the tracks.

Other objects and advantages of the invention will be apparent from the following description taken in connection with the accompanying drawings. It will be understood that changes may be made in the details of construction and arrangement of parts shown and described without departing from the spirit of the invention, as the preferred form has been given by way of illustration only.

Referring to the drawings:

Fig. 4 is a perspective view of the equipment mounting sub-frame assembly and showing the connection of the assembly to the tractor.

Figure 1:
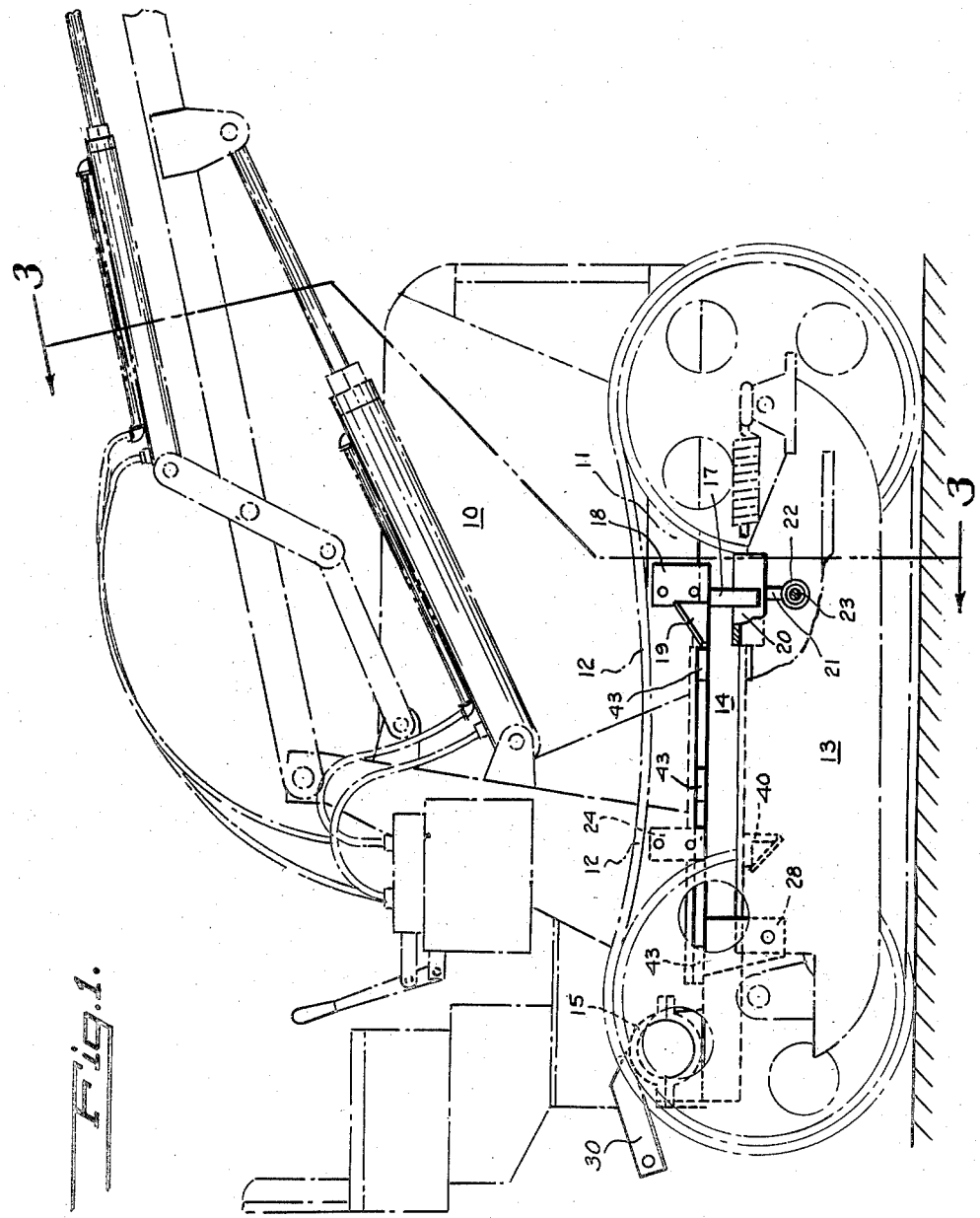
Fig. 1 is a side view of a tractor having a loader thereon, and showing the invention.
Figure 2:
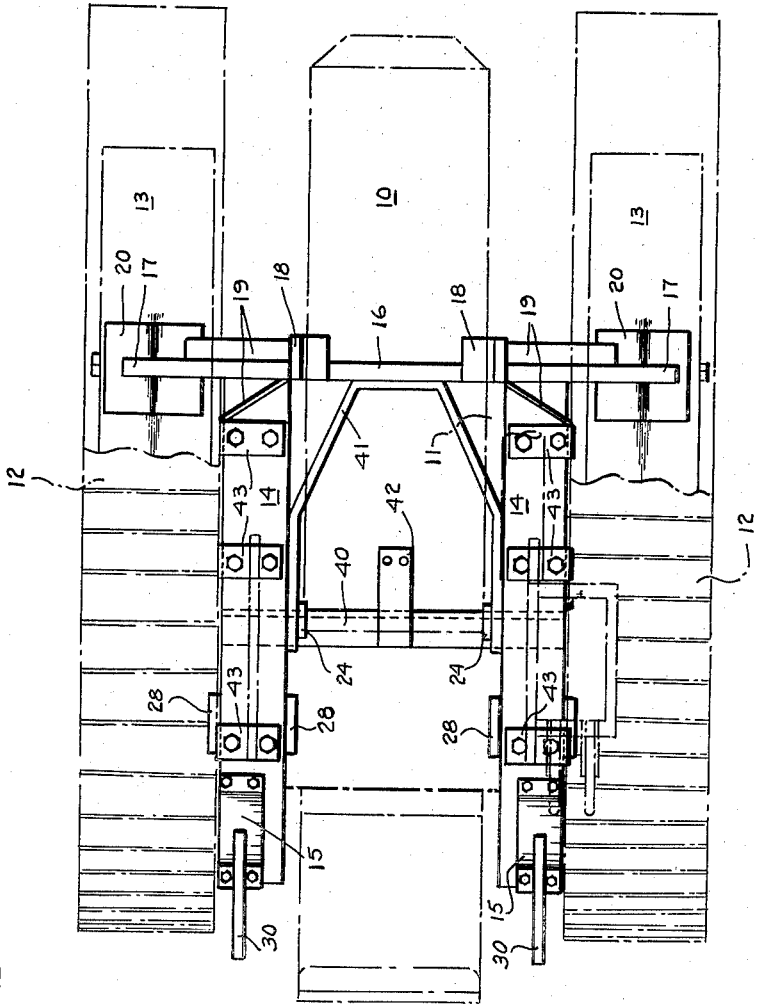
Fig. 2 is a top or plan view of the arrangement shown in Fig. 1.
Figure 3:
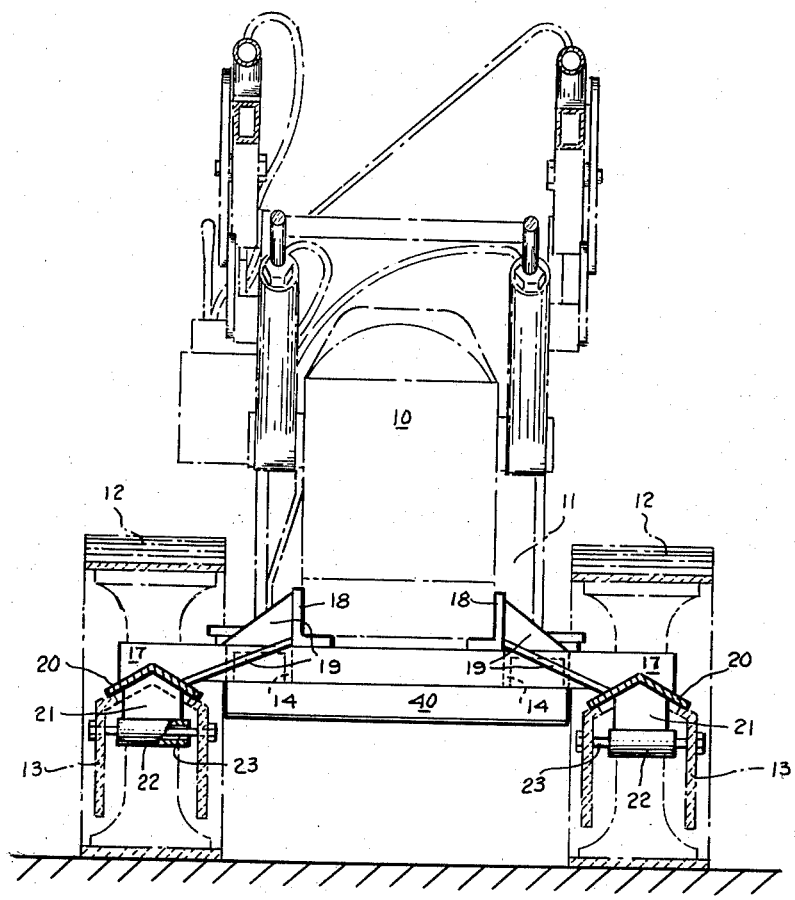
Fig. 3 is a sectional view taken on line 3—3 of Fig. 1, looking in the direction of the arrows.

Referring more particularly to the drawings wherein similar reference characters designate corresponding parts throughout, the arrangement shown comprises a track-type tractor having the usual engine 10, frame 11, tracks 12 and track frame 13.

The sub-frame assembly comprises the pair of spaced parallel supports 14 adapted to extend longitudinally of the tractor in parallel relation with the tractor frame 11 and the supports 14 which are provided with upwardly extending brackets or lugs 24 are secured to the respective support 14 by welding or other suitable manner and is adapted to be secured to a respective tractor frame member 11 by bolts or other suitable manner.

These supports 14 are each provided adjacent their rear ends with securing means or clamps 15 for securing the supports 14 to the tractor axle. On each of these clamps 15 is secured a lug 30 having a pivot connection for use in connecting equipment to the tractor.

Adjacent the forward ends of the spaced supports is provided the transverse connecting member which is secured intermediate its ends to supports 14 by welding or other suitable means. Connecting member 16 has the end portions 17 extending beyond the connections of connecting member 16 and supports 14 and each of these end portions 17 has an angled support 20 secured thereto and overlying the upper sides of track frames 13 on the opposite sides of the tractor.

Each of the angled supports 20 has a depending supporting member 21 secured thereto and terminating in a tubular bearing 22 adapted to receive a bolt 23 which also extends through openings in the opposite sides of track frame 13 for securing the sub-assembly in operative relation with the track frames. The tubular bearings 22 are each preferably of larger diameter than bolts 23 whereby a predetermined amount of vertical movement is allowed between the track frames and support while providing additional strength and the angled supports 20 allow the support to rest on the track frames 13.

The connecting member 16 is also provided with the oppositely disposed connecting members 18 which are adapted to be connected to the opposite supports of the tractor frame by bolts or rivets although welding or other suitable rigid connecting means may be employed. The struts 19 may be provided for additional rigidity and strength.

The supports 14 are also connected by the angled reinforcing bar 40 which is secured to the underside of supports 14 by welding or other suitable means.

The supports 14 are also connected to member 16 by reinforcing strut 41 by welding or other suitable means for increasing the rigidity of the assembly. Reinforcing bar 40 has the lug 42 for connecting the bar 40, adjacent its center, to the tractor frame.

It is pointed out that the supports 14 and connecting members 16 may be of flat stock, or channeled, or of other desired shape.

The supports 14 are also provided with depending lugs 28 having pivot connections.

As will be seen from Fig. 4, with the supports 14 may be provided the pads 43 on its upper surface with connection openings therethrough, and with these connections as well as lugs 28 and lugs 30, the tractor will be adapted for connection to tractor mounted accessories and that means is provided for adding rigidity and strength to the whole tractor and for readily mounting equipment singly or in any variation without danger of harm to the tractor, and simply and easily.

The operation of the invention is believed apparent from the foregoing, from which it will be seen that means has been provided for obtaining all of the objects and advantages of the invention.

I claim:

1. In an equipment mounting sub-frame assembly for attachment to a tractor having a frame, an axle and track frames on opposite sides of said frame, said assembly comprising a pair of spaced parallel supports, a transverse connecting member connected to said supports, first connecting means carried by each of said supports for connection to the tractor axle, second connecting means spaced from said first connecting means for connecting said assembly to the tractor frame, said transverse connecting member having its end portions adapted to overlie the track frames of the tractor, and said overlying portions being complementary to said track frames, and means for connecting said overlying portions to said track frames, said connecting means comprising depending lugs carried by each of said overlying portions and tubular portions adjacent the lower end of each of said lugs and a connecting member adapted to extend through aligned openings in said track frames and each of said tubular portions.

2. In an equipment mounting sub-frame assembly for attachment to a tractor having a frame, an axle and track frames on opposite sides of said frame, said assembly comprising a pair of spaced parallel supports, a transverse connecting member connected to said supports, first connecting means carried by each of said supports for connection to the tractor axle, second connecting means spaced from said first connecting means for connecting said assembly to the tractor frame, said transverse connecting member having its end portions adapted to overlie the track frames of the tractor, and said overlying portions being complementary to said track frames, and means for connecting said overlying portions to said track frames, said connecting means comprising depending lugs carried by each of said overlying portions and tubular portions adjacent the lower end of each of said lugs and a connecting member extending through aligned openings in said track frames and each of said tubular portions and comprising transverse tubular portions carried by each of said overlying portions and a connecting member connected to each of said track frames and extending through respective tubular portions.

3. In an equipment mounting sub-frame assembly for attachment to a tractor having a frame, an axle and track frames on opposite sides of said frame, said assembly comprising a pair of spaced parallel supports, a transverse connecting member connected to said supports, first connecting means carried by each of said supports for connection to the tractor axle, second connecting means spaced from said first connecting means for connecting said assembly to the tractor frame, said transverse connecting member having its end portions adapted to overlie the track frames of the tractor, and said overlying portions being complementary to said track frames, said complementary portions comprising longitudinal recessed angled portions carried by said overlying portions, said connecting means comprising depending lugs carried by each of said overlying portions and tubular portions adjacent the lower end of each of said lugs and a connecting member extending through aligned openings in said track frames and each of said tubular portions.

4. In an equipment mounting sub-frame assembly for attachment to a tractor having a frame, an axle and track frames on opposite sides of said frame, said assembly comprising a pair of spaced parallel supports, a transverse connecting member connected to said supports, first connecting means carried by each of said supports for connection to the tractor axle, second connecting means spaced from said first connecting means for connecting said assembly to the tractor frame, said transverse connecting member having its end portions adapted to overlie the track frames of the tractor, and said overlying portions being complementary to said track frames, said complementary portions comprising longitudinal recessed angle portions carried by said overlying portions, said connecting means comprising depending lugs carried by each of said overlying portions and tubular portions adjacent the lower end of each of said lugs and a connecting member adapted to extend through aligned openings in said track frames and each of said tubular portions, the diameter of said tubular portions being substantially larger than the diameter of said connecting means.

References Cited in the file of this patent
UNITED STATES PATENTS

| | | |
|---|---|---|
| 1,933,018 | Jobe | Oct. 31, 1933 |
| 2,091,464 | Baker | Aug. 31, 1937 |
| 2,133,633 | Rabe | Oct. 18, 1938 |
| 2,636,750 | Vahey | Apr. 28, 1953 |